United States Patent [19]
Rozendaal et al.

[11] Patent Number: 5,556,253
[45] Date of Patent: Sep. 17, 1996

[54] AUTOMATIC PIPE-LOADING DEVICE

[75] Inventors: Peter C. Rozendaal; David P. Langenfeld, both of Pella, Iowa

[73] Assignee: Vermeer Manufacturing Company, Pella, Iowa

[21] Appl. No.: 438,696

[22] Filed: May 11, 1995

[51] Int. Cl.$^6$ ............................................ B65G 59/06
[52] U.S. Cl. ........................... 414/797.7; 198/370.01; 198/448; 198/468.2; 414/732; 414/746.4; 414/797.8
[58] Field of Search ..................... 198/370.01, 448, 198/468.2; 414/732, 746.4, 797.7, 797.8, 797.9

[56] References Cited

U.S. PATENT DOCUMENTS 3,151,747  10/1964  McGoogan ................ 414/746.4 X
3,478,632  11/1969  Schmermund ............... 198/448 X

FOREIGN PATENT DOCUMENTS 62-74543  4/1987  Japan ..................... 414/746.4

OTHER PUBLICATIONS

Brochure of Straight Line Manufacturing, Inc. for Direct Line DL1510.
Technical Report Direct Line 4010 of Straight Line Manufacturing, Inc. (dated Oct. 10, 1994).
Brochure of Ditch Witch JT 2310 Directional Boring System (dated Mar., 1995).

*Primary Examiner*—Karen B. Merritt
*Assistant Examiner*—Janice L. Krizek
*Attorney, Agent, or Firm*—Merchant, Gould, Smith, Edell, Welter & Schmidt

[57] ABSTRACT

An automatic pipe loading device includes a magazine containing a plurality of pipes which are gravity fed through a discharge opening at a discharge end of the magazine. A pipe transfer member is mounted beneath the magazine and rotates between load and unload positions. In a load position, the pipe transfer mechanism presents a pocket in alignment with a discharge opening of the magazine. In all other positions, the pipe transfer mechanism presents a blocking surface preventing pipes from being discharged from the magazine. The pipe transfer member includes a pipe grip for grasping a pipe received within the receiving pocket and releasing the grasped pipe at a desired location.

7 Claims, 6 Drawing Sheets

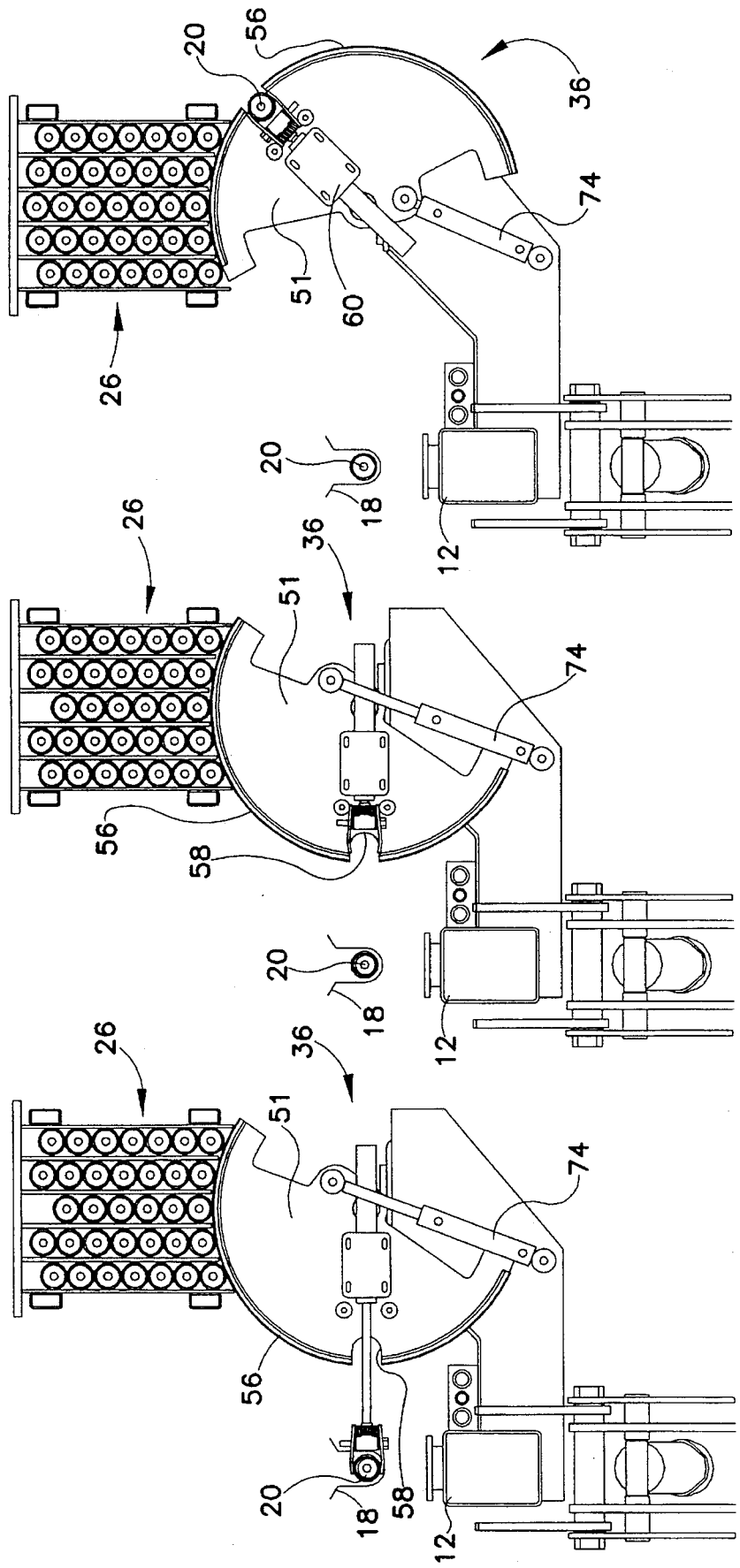

1

AUTOMATIC PIPE-LOADING DEVICE

BACKGROUND OF THE INVENTION

1. Field of the Invention

This invention pertains to devices for loading pipe onto a machine. More particularly, this invention pertains to an automatic pipe-loading device.

2. Description of the Prior Art

In the prior art, machines exist requiring periodic placement of pipe on the machine. An example of such a machine is an underground directional boring machine which forces a length of pipe through the ground in order to form a bore through the ground. The intent of the device is that after the bore is formed, a cable or the like may be passed through the bore. Such underground boring machines eliminate the need for digging a long trench into which a cable may be laid.

In underground boring machines, a fixed length of pipe is placed on a machine and then forced into the ground. After the full length of the pipe has been forced into the ground, a subsequent length of pipe is placed on the machine and coupled to the first length. The combined length is then further forced into the ground. A third length of pipe is then placed on the machine and coupled to the second length. In order to form a complete bore, numerous lengths of pipe must be placed on the machine throughout the operation of the boring machine.

Pipe used in directional boring machines come in a variety of lengths and weights. For example, in the directional boring industry, 10 foot long pipes are frequently used weighing about 70 pounds each. Fifteen foot pipes are also used weighing from 100–150 pounds each.

In the prior art, when doing directional boring, a load of pipe is delivered to the work site. A worker commonly picks up each individual pipe and places it on the boring machine when a new length of pipe is desired. It will be appreciated that where substantial lengths of pipe are required, an individual worker must lift and place a substantial number of heavy pipes. Indeed, for 15 foot pipes, two workers may be necessary to load and place a single pipe due to its weight. It is desirable to permit automatic loading of pipe and eliminate the need for a worker to have to lift and place substantial numbers of heavy pipes.

SUMMARY OF THE INVENTION

According to a preferred embodiment of the present invention, an automatic loading device for pipe is provided. The automatic loading device includes a magazine containing a plurality of pipes for gravity feed discharge through at least a first discharge opening of the magazine. A pipe transfer member is mounted for movement through a path of travel. The pipe transfer member has a surface which opposes the discharge end throughout its movement. The surface includes a pipe-receiving pocket sized and positioned to receive a pipe discharged from the magazine when the pipe transfer member is in a load position. The remainder of the surface of the pipe transfer member is disposed to block the discharge opening of the magazine when the pipe transfer member is in a position other than the discharge position. The pipe transfer member includes a pipe grip for grasping a pipe received within the pipe-receiving pocket and releasing the grasped pipe into the receiving location of the machine when the pipe transfer member is in a pipe-unload position.

BRIEF DESCRIPTION OF THE DRAWINGS

FIG. 8 is the view of FIG. 7 showing the pipe transfer member in an unload position and prior to releasing a pipe;

FIG. 9 is the view of FIG. 8 showing the pipe transfer member in an unload position following releasing of a pipe; and FIG. 10 is the view of FIG. 9 showing a pipe transfer member moved to a manual load position.

DESCRIPTION OF THE PREFERRED EMBODIMENT

Figure 1:
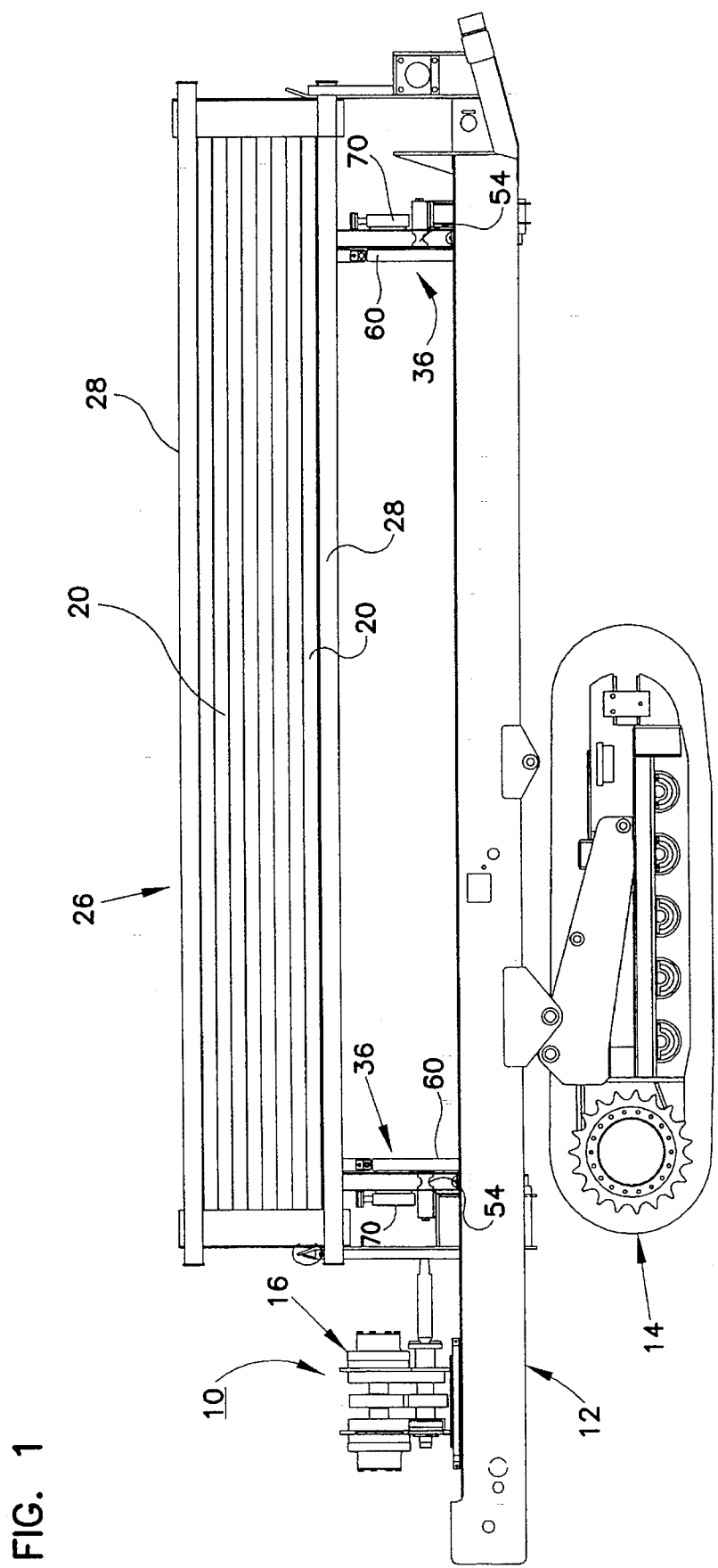
FIG. 1 is a side elevation view of a directional boring machine incorporating an automatic pipe-loading device according to the present invention.

With reference to the various drawing figures in which identical elements are numbered identically throughout, a description of the preferred embodiment of the present invention will now be provided. The present invention will be described with reference to a pipe-loading device for use in underground boring machine 10. However, it will be appreciated that the present invention may be used with a wide variety of machines where it is desirable to load pipe.

Although not essential for a complete understanding of the present invention, a brief description of the boring machine 10 will be provided for ease of illustration. The boring machine 10 includes a frame 12 mounted on tracks 14. Carried on the frame 12 is a drive 16 for advancing and threading pipe together. Shown schematically in FIG. 2, the machine 10 includes a pipe-receiving bracket 18 for receiving a pipe length 20. The pipe-receiving bracket 18 has a generally U-shaped configuration such that a pipe 20 may be dropped into the bracket 18. In the past, a worker would simply lift a pipe and place it into the bracket 18.

Figure 2:
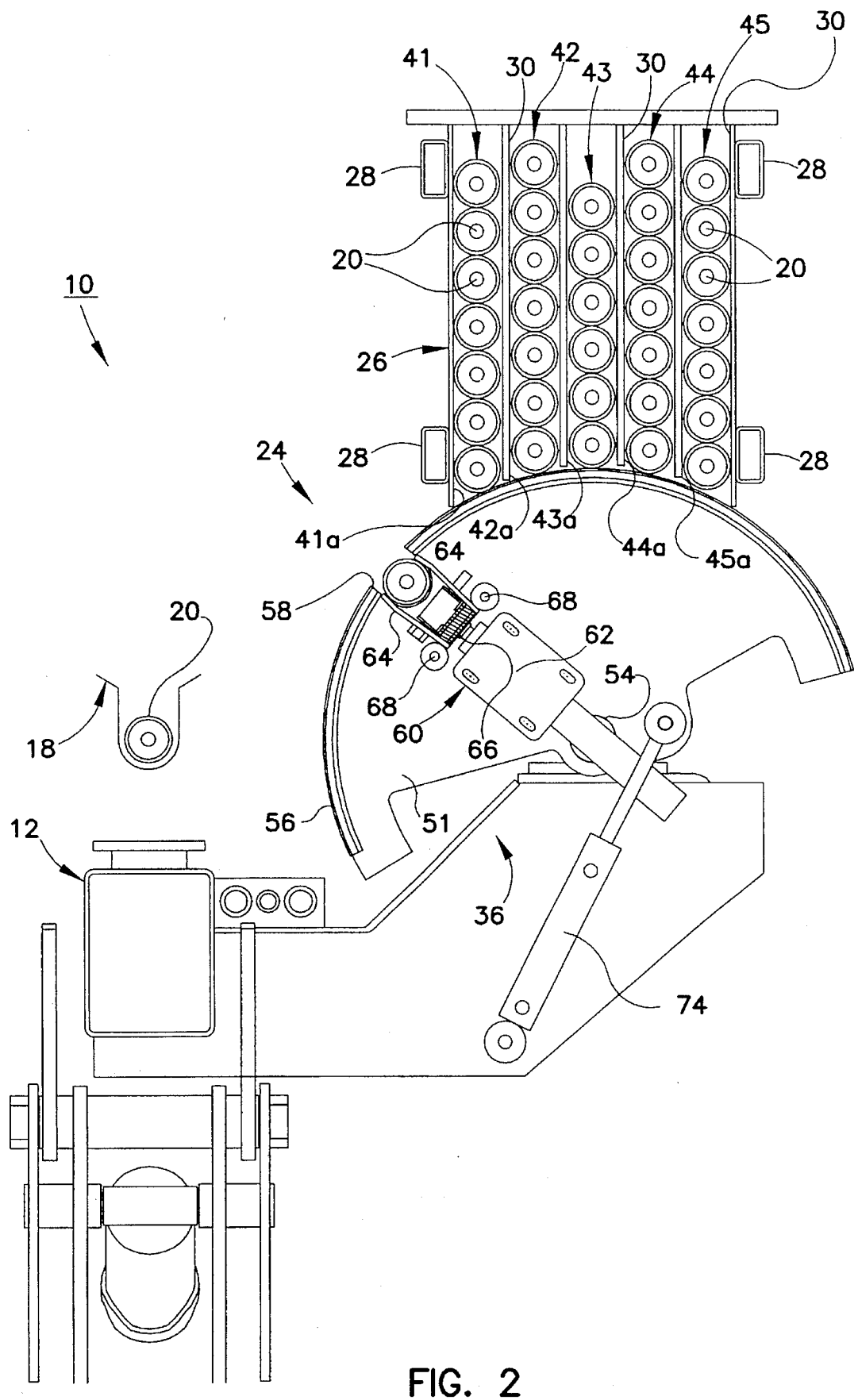
FIG. 2 is an end elevation view of the machine of FIG. 1.

The present invention is directed to an automatic pipe-loading device 24 which includes a magazine 26 containing a plurality of pipes 20. The magazine 26 is a box-shaped frame having longitudinally extending support members 28 and a plurality of vertical dividing walls 30 (FIG. 2). The walls 30 divide the magazine 26 into a plurality of columns 41–45 shown best in FIG. 2. Each of the columns contains a plurality of pipes 20 with the pipes aligned vertically within each of columns 41–45. The columns 41–45 are provided with a width approximately equal to the width of a pipe 20.

In the example shown, the magazine 26 includes five columns containing seven pipes each. Accordingly, 35 pipes are contained within the magazine 26. It will be appreciated that magazine 26 can be provided with more or fewer columns and with more or fewer pipes per column. The magazine is open at its bottom end such that the space between walls 30 defines a plurality of discharge openings 41a–45a. So constructed, the pipes 20 are disposed within the magazine 26 for the pipes to be discharged through openings 41a–45a through the influence of gravity. For reasons that will become apparent, the bottom end of the magazine 26 is arcuate shaped (in the view of FIG. 2) to define an arc of a circle. The magazine 26 may further include a lifting eye (not shown) such that the entire magazine 26 may be lifted by a crane to be placed on the machine 10 or to be removed.

Figure 3:
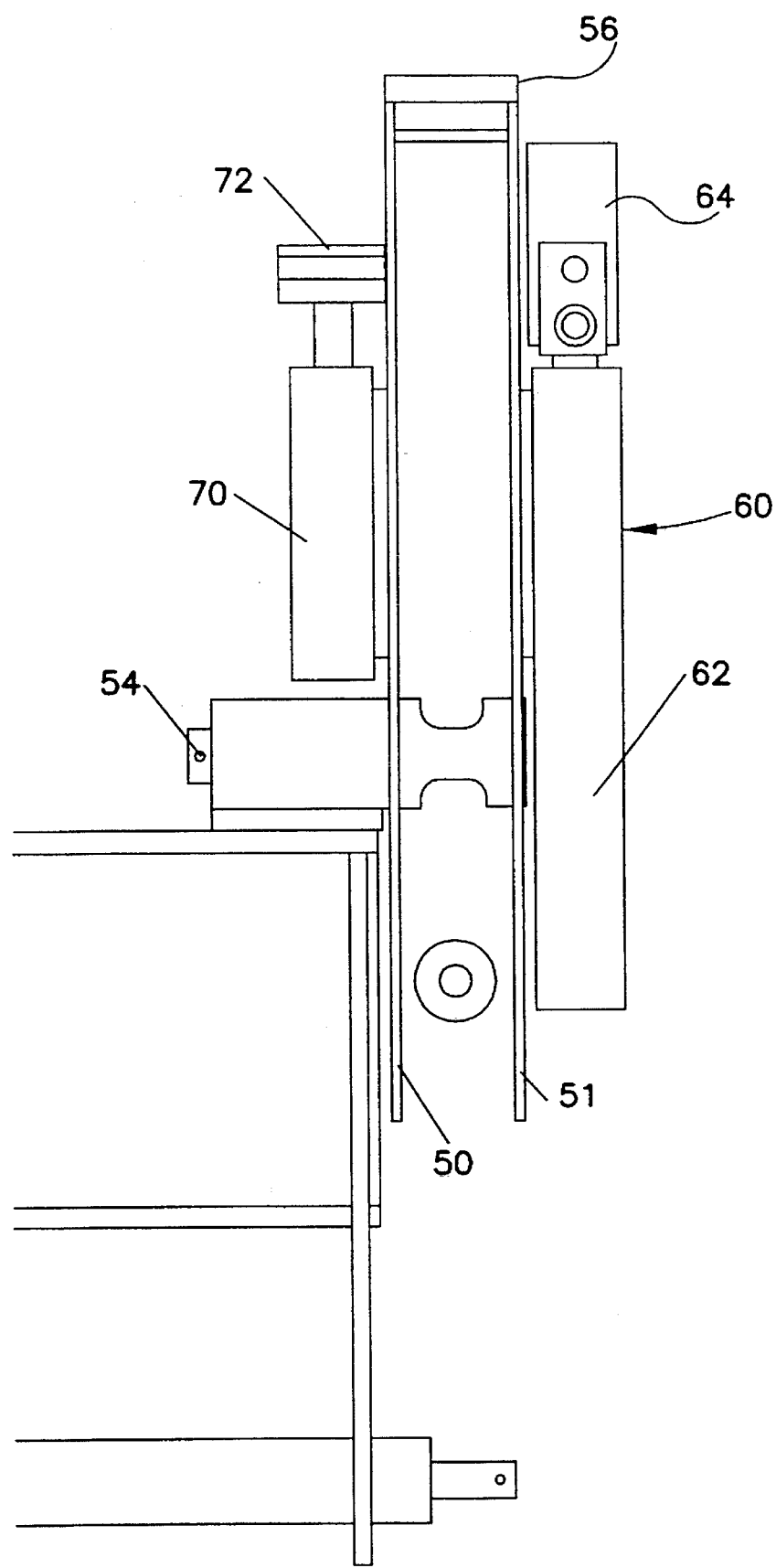
FIG. 3 is a side view of a transfer member.
Figure 5:
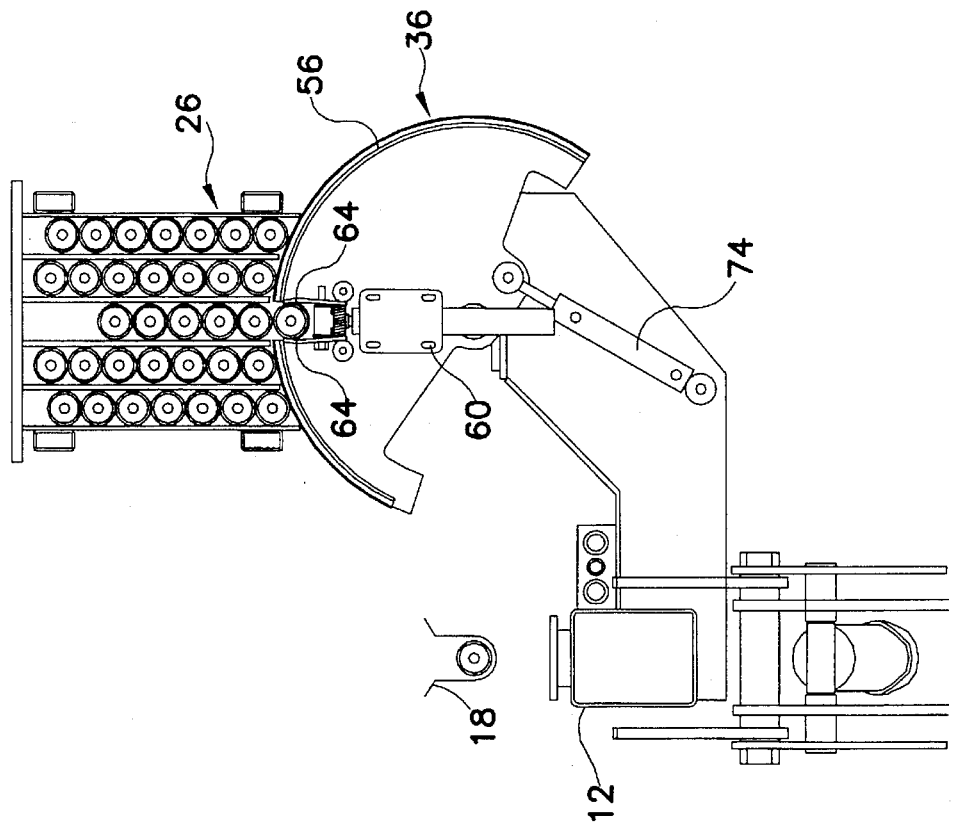
FIG. 5 is the view of FIG. 4 showing a pipe transfer member after receiving a pipe.

The present invention includes pipe transfer members 36 positioned near opposite ends of the magazine 26 (FIG. 1). Each of pipe transfer members 36 is identical and a description of one will suffice with reference to FIGS. 2 and 3 as a description of the other.

The pipe transfer mechanism 36 is arcuate and includes two side plates 50, 51. The pipe transfer member 36 has an axially extending pivot pin 54 such that the transfer member 36 may be rotated about pin 54. The pipe transfer member has an arcuate outer edge set at a radius from pin 54 equal to the radius of curvature of the bottom end of the magazine 26. Further, the pipe transfer mechanism 36 is mounted such that its axis of rotation is generally parallel to the longitudinal axis of the pipes 20 contained within magazine 26.

An outer circumferential edge of the pipe transfer mechanism 36 is provided with a plastic wear strip 56. The pipe transfer mechanism 36 is mounted abutting the discharge end of the magazine 26 such that the pipes within columns 41–45 rest against the wear strip 56 as member 36 rotates about its axis.

A pocket 58 is formed through plates 50, 51 and plastic wear strip 56. The pocket 58 is sized to receive a pipe 20.

A pipe grip 60 is mounted on the transfer member 36 for movement therewith. The grip 60 includes a grip extender 62 in the form of a hydraulic cylinder such that grip 60 may be moved toward or away from the axis of rotation of the transfer member 36.

The grip 60 includes opposing gripping fingers 64 which are pivotally mounted on the grip 60 and urged to grip a pipe 20 by reason of a spring 66. The spring 66 urges the fingers 64 to move to a grip position to grasp a pipe 20 received within pocket 58. Cams 68 are mounted on plate 51 and positioned to engage the gripping fingers 64 when the grip 60 is in a retracted position such as that shown in FIG. 2. As the cams 68 engage the gripping fingers 64, the gripping fingers 64 are urged against the bias of spring 66 to an open position such that a pipe 20 may freely pass between gripping fingers 64. When the hydraulic cylinder 62 is actuated to urge the grip 60 to an extended position (such as that shown in FIG. 7), the fingers 64 are moved away from the cams 68. Accordingly, the spring 66 causes the gripping fingers 64 to securely grip the pipe 20.

The invention further includes a push cylinder 70 (FIG. 3) mounted on plate 50. The push cylinder 70 is a hydraulic cylinder which terminates at a blocking surface 72. Cylinder 70 advances and retracts surface 72 between two positions. In an extended position, surface 72 is generally in flush alignment with plastic wear strip 56. In a retracted position, cylinder surface 72 is below the positioning of a pipe 20 received within pocket 58.

To rotate the transfer member 36 about its axis, a hydraulic cylinder 74 is provided having a cylinder end secured to the frame and a piston end secured to either of plates 50, 51 at a position away from the axis of rotation. Accordingly, expansion or retraction of cylinder 74 causes rotation of the transfer member about its axis.

Figure 4:
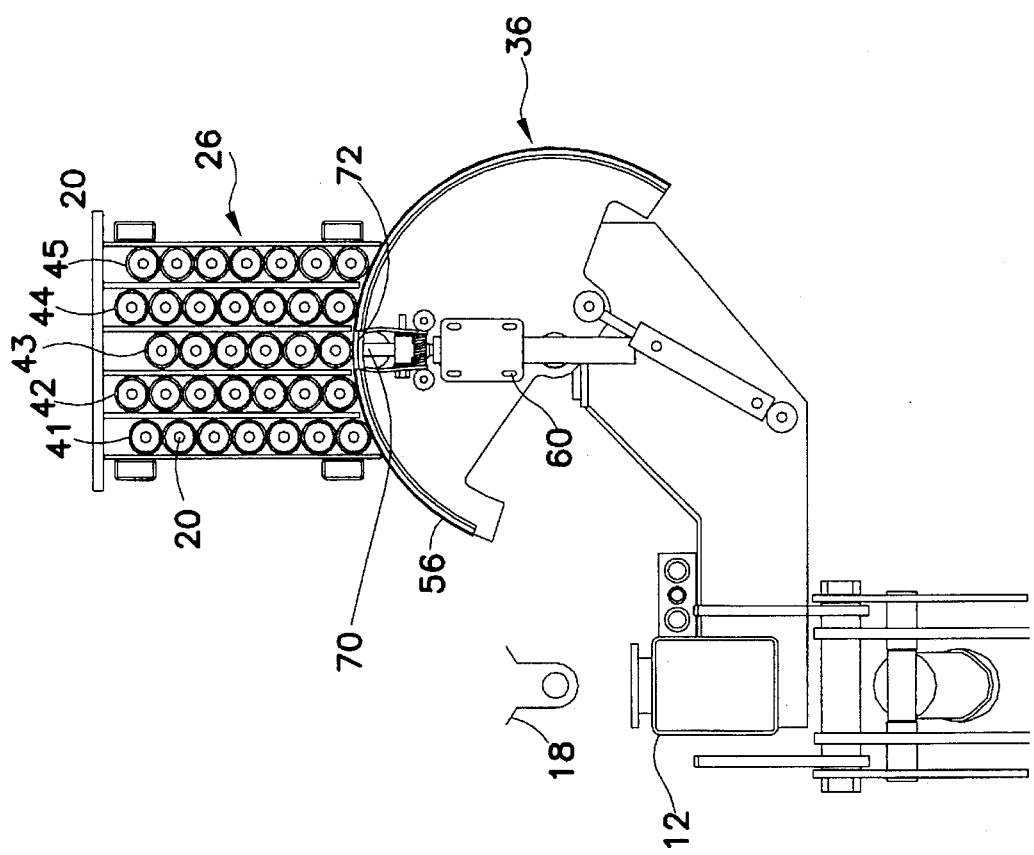
FIG. 4 is the view of FIG. 2 showing a pipe transfer member in a load position prior to receiving a pipe.

With the structure of the invention thus described, the operation of the invention can now be appreciated with reference to FIGS. 4–10. In FIG. 4, transfer member 36 is shown with the pocket 58 aligned with column 43 of magazine 26. The grip 60 is shown in a retracted position. Accordingly, the gripping fingers 64 are spread apart (by reason of cams 68) in a position to receive a pipe from column 43. However, the push cylinder 70 is shown in an extended position such that the blocking surface 72 is generally flush with strip 56. Accordingly, a pipe from column 43 may not fall into the pocket. Also, it should be noted that the plastic strip 56 acts as a blocking surface to prevent any pipe from any of the other columns 41, 42, 44 and 45 from dropping out of the magazine.

When it is desired to load a pipe from column 43, the push cylinder 70 is retracted such that the blocking surface 72 is lowered to permit a pipe 20 to drop from column 43 into the pocket. In this position, the pipe 20 is now positioned below the strip 56 and received between the fingers 64 of the grip 60 (see FIG. 5). The cylinder 74 is then actuated to rotate the transfer member in a counterclockwise direction in the view of FIG. 6.

Figure 7:
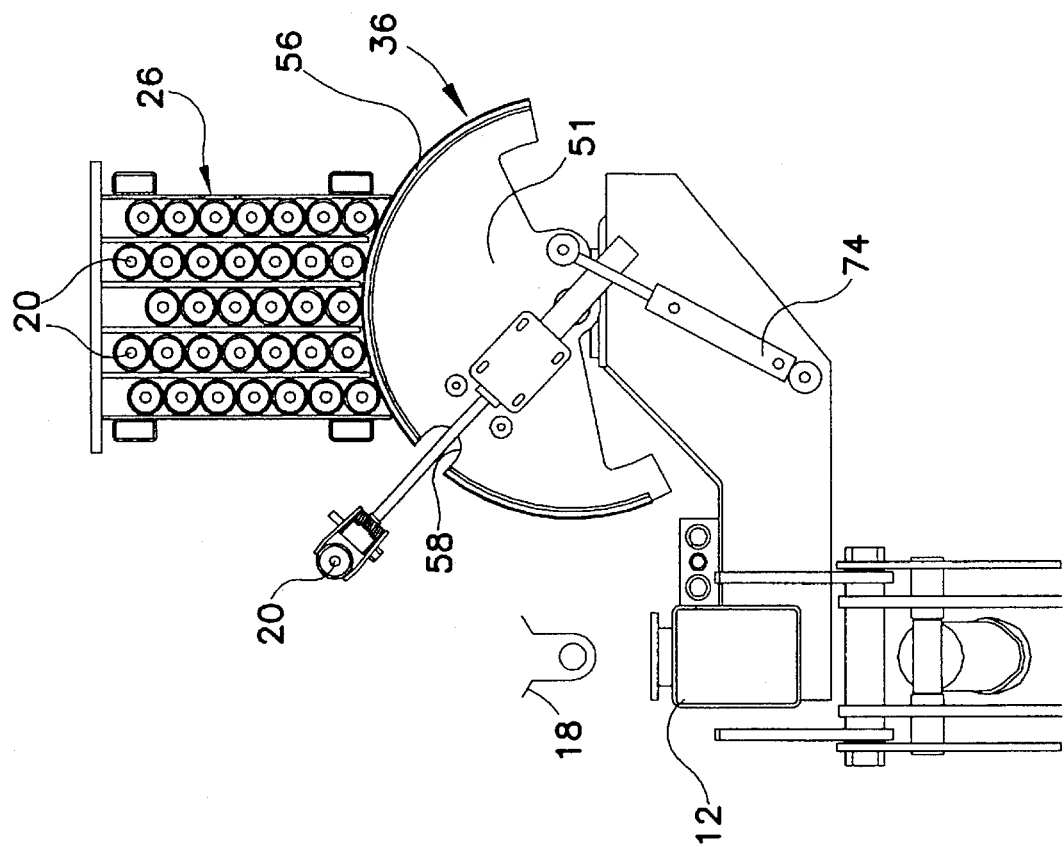
FIG. 7 is the view of FIG. 6 with a pipe holder extended.
Figure 6:
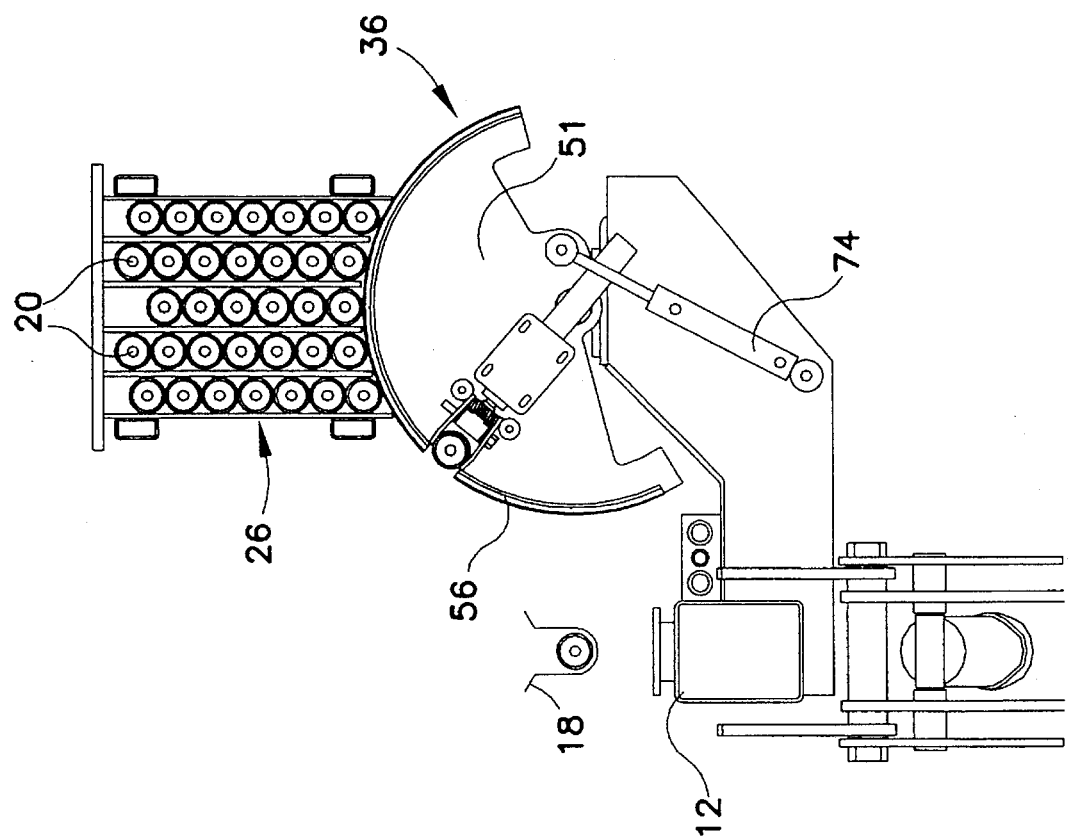
FIG. 6 is the view of FIG. 5 with the pipe transfer member moved away from a load position and prior to attaining an unload position and with a pipe holder retracted.

When the pocket 58 has cleared the magazine, the grip cylinder 62 is extended such that the grip 60 is moved radially away from the transfer member (see FIG. 7). As the grip 60 moves away from the transfer member 36, the influence of the cams 68 is eliminated and the spring 66 urges the gripping fingers 64 to securely grip the pipe 20. It should be noted that in the process of moving the transfer member 36 from the position of FIG. 5 to that of FIG. 7, the remaining pipe 20 within magazine 26 ride against the plastic strip 56 and are prevented from dropping out of the magazine 26.

FIG. 8 shows the transfer member 36 in a load position where the pipe 20 in grip 60 is received within the bracket 18. It will be appreciated that the bracket 18 is positioned to be on the side of the grip such that the bracket 18 does not interfere with the grip itself. Instead, a portion of the pipe extending beyond the grip is received within the bracket 18.

With the pipe 20 received within the bracket 18, a side wall of the bracket prevents lateral movement of the pipe 20. Accordingly, when cylinder 62 is retracted, the spring 66 of grip 60 compresses as the grip 60 moves laterally but as the pipe 20 is restricted from such lateral movement by reason of the side wall of the bracket. Accordingly, the pipe 20 remains within the bracket and the grip 60 becomes fully retracted as shown in FIG. 9. When it is desirable to select another pipe from any of columns 41–45, the push cylinder 70 is expanded to place the blocking surface 72 in a blocking position (as in FIG. 4) and the transfer member 36 is then pivoted such that the pocket 58 is aligned with the column from which it is desired to remove a pipe.

The present invention permits manual loading of a pipe by simply rotating the pipe transfer mechanism 36 clockwise to a position with the pocket clearing magazine 26 as shown in FIG. 10. Accordingly, a pipe 20 may be manually placed into the pocket 18.

After a load of pipe from a magazine has been completely placed, the entire magazine 26 may be removed by a crane and a full magazine may be put in its place.

From the foregoing detailed description of the present invention, it has been shown how the objects of the invention have been attained in a preferred manner. However, modifications and equivalents of the disclosed concepts such as those which readily occur to one skilled in the art are intended to be included within the scope of the claims which are appended hereto.

What is claimed is:

1. An automatic load device for loading pipe onto a machine having a fixed pipe receiving location, said device comprising:

a magazine containing a plurality of pipes disposed in said magazine for gravity feed discharge through at least a first discharge opening of a discharge end of said magazine;

a pipe transfer member mounted for movement through a path of travel between a plurality of positions including at least a first pipe load position and a pipe unload position;

said pipe transfer member having a surface opposing said discharge end throughout movement of said pipe transfer member through said path of travel, said surface including a pipe receiving pocket sized and positioned to receive a pipe discharged through said first discharge opening when said pipe transfer member is in said first pipe load position and a remainder of said surface disposed to block discharge of a pipe from said first discharge opening when said pipe transfer member is in a position other than said first pipe load position;

said pipe transfer member including a pipe grip for grasping a pipe received within said pipe receiving pocket and releasing said grasped pipe into said receiving location of said machine when said pipe transfer member is in said pipe unload position; and said magazine includes a plurality of pipe discharge openings and said plurality of positions of said pipe transfer member includes a plurality of pipe load positions with respective ones of said plurality of pipe load positions associated with individual ones of said plurality of pipe discharge openings for a pipe to be discharged from any selected one of said discharge openings into said pipe receiving pocket when said pipe transfer member is in a pipe load position associated with said selected one.

2. An automatic load device according to claim 1 wherein said remainder of said surface is disposed to block discharge of a pipe from any one of said plurality of discharge openings when said pipe transfer member is in a position other than a discharge position associated with said any one.

3. An automatic load device according to claim 2 further comprising a temporary block for blocking said pipe receiving pocket at an option of an operator when said pipe receiving pocket is positioned in a position other than a position opposing a desired one of said plurality of discharge openings.

4. An automatic load device according to claim 3 wherein said temporary block includes a block surface mounted on said pipe transfer member for movement therewith, said pipe transfer member having means for selectively moving said block surface between a block position blocking movement of a pipe into said pipe receiving pocket and an open position permitting unobstructed movement of a pipe into said pipe receiving pocket.

5. An automatic load device for loading pipe onto a machine having a fixed pipe receiving location, said device comprising:

a magazine containing a plurality of pipes disposed in said magazine for gravity feed discharge through at least a first discharge opening of a discharge end of said magazine;

a pipe transfer member mounted for movement through a path of travel between a plurality of positions including at least a first pipe load position and a pipe unload position;

said pipe transfer member having a surface opposing said discharge end throughout movement of said pipe transfer member through said path of travel, said surface including a pipe receiving pocket sized and positioned to receive a pipe discharged through said first discharge opening when said pipe transfer member is in said first pipe load position and a remainder of said surface disposed to block discharge of a pipe from said first discharge opening when said pipe transfer member is in a position other than said first pipe load position;

said pipe transfer member including a pipe grip for grasping a pipe received within said pipe receiving pocket and releasing said grasped pipe into said receiving location of said machine when said pipe transfer member is in said pipe unload position;

said pipe grip includes a grip extender for positioning said grip in a retracted position away from said surface on a side thereof opposite said magazine when said pipe transfer member is in a pipe load position and extending said grip to an extended position toward said fixed pipe receiving location when said pipe transfer member is in said pipe unload position;

said pipe grip includes gripping members movable between a grip position and a release position, in said grip position said gripping members are urged toward one another to securely grasp a pipe therebetween, in said release position said gripping members are spaced apart a distance sufficient to pass a pipe therebetween;

biasing means for biasing said gripping members to said grip position; and cam means for urging said gripping members against a bias of said biasing means to said release position as said grip is moved to said retracted position.

6. An automatic load device according to claim 5 wherein said machine includes a pipe receiving bracket at said pipe receiving location, said pipe receiving bracket having an open end for receiving placement of a pipe by said grip as said pipe transfer member is moved to said unload position.

7. An automatic load device according to claim 6 wherein said pipe receiving bracket includes a sidewall opposing lateral movement of a pipe received within said pipe receiving bracket, said biasing means selected to have a bias to release a pipe from said grip as said grip is moved to said retracted position and said sidewall opposes lateral movement of a pipe retained by said grip and received within said pipe receiving bracket.

\* \* \* \* \*